Jan. 9, 1940.   J. W. ALBIN   2,186,746
DOUBLE COIL SPRING FASTENING DEVICE
Filed Dec. 15, 1937   2 Sheets-Sheet 1
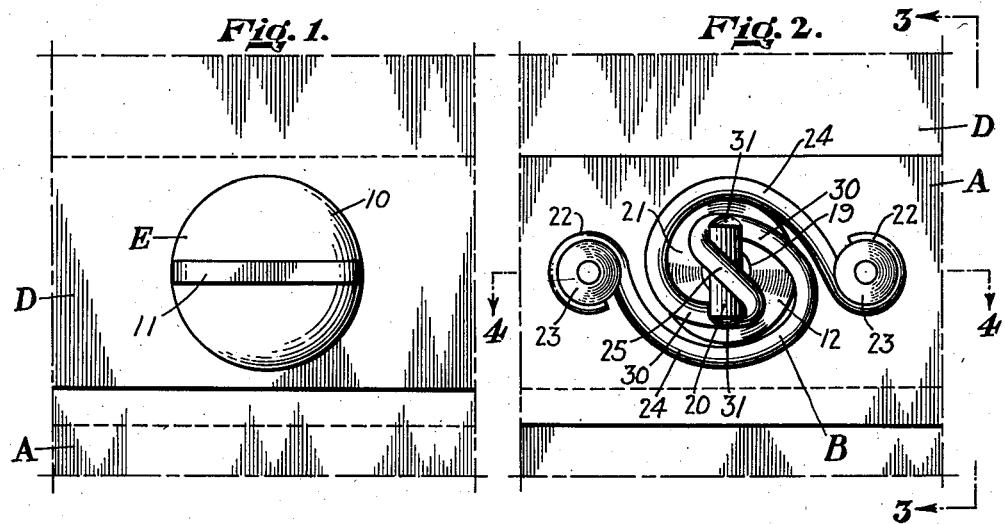
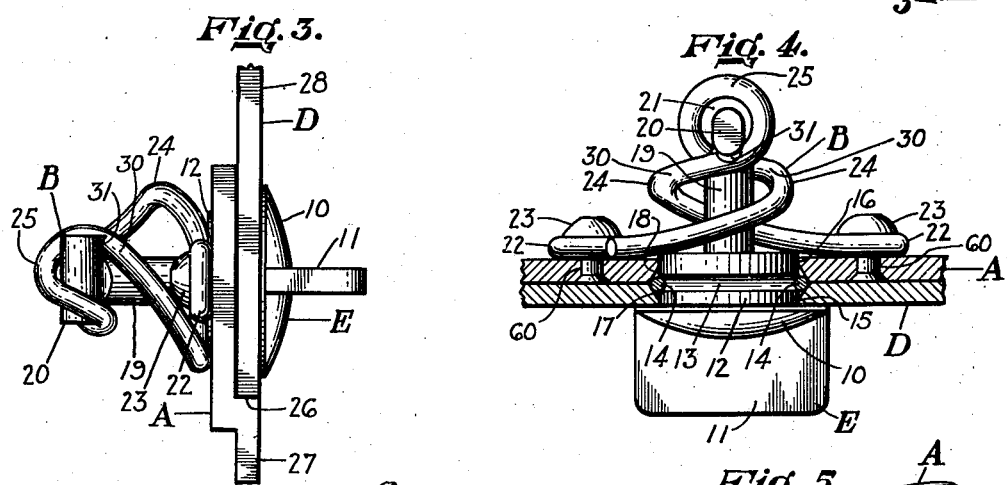
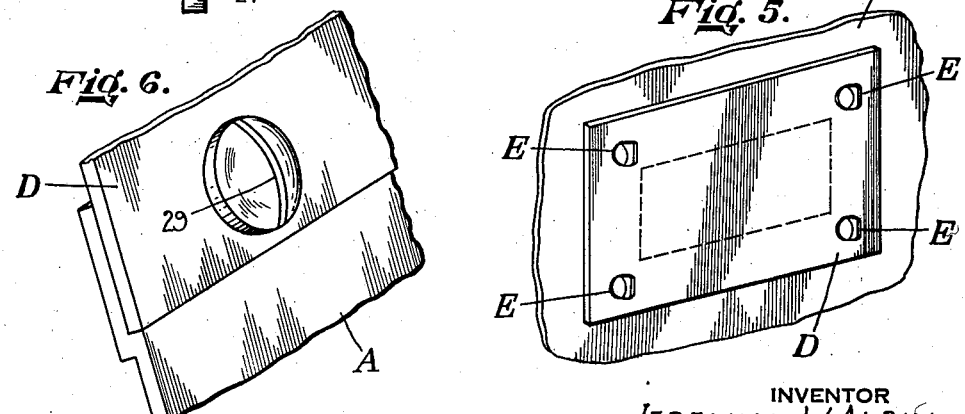
INVENTOR
JEREMIAH W. ALBIN
BY
Richards & Geier
ATTORNEYS

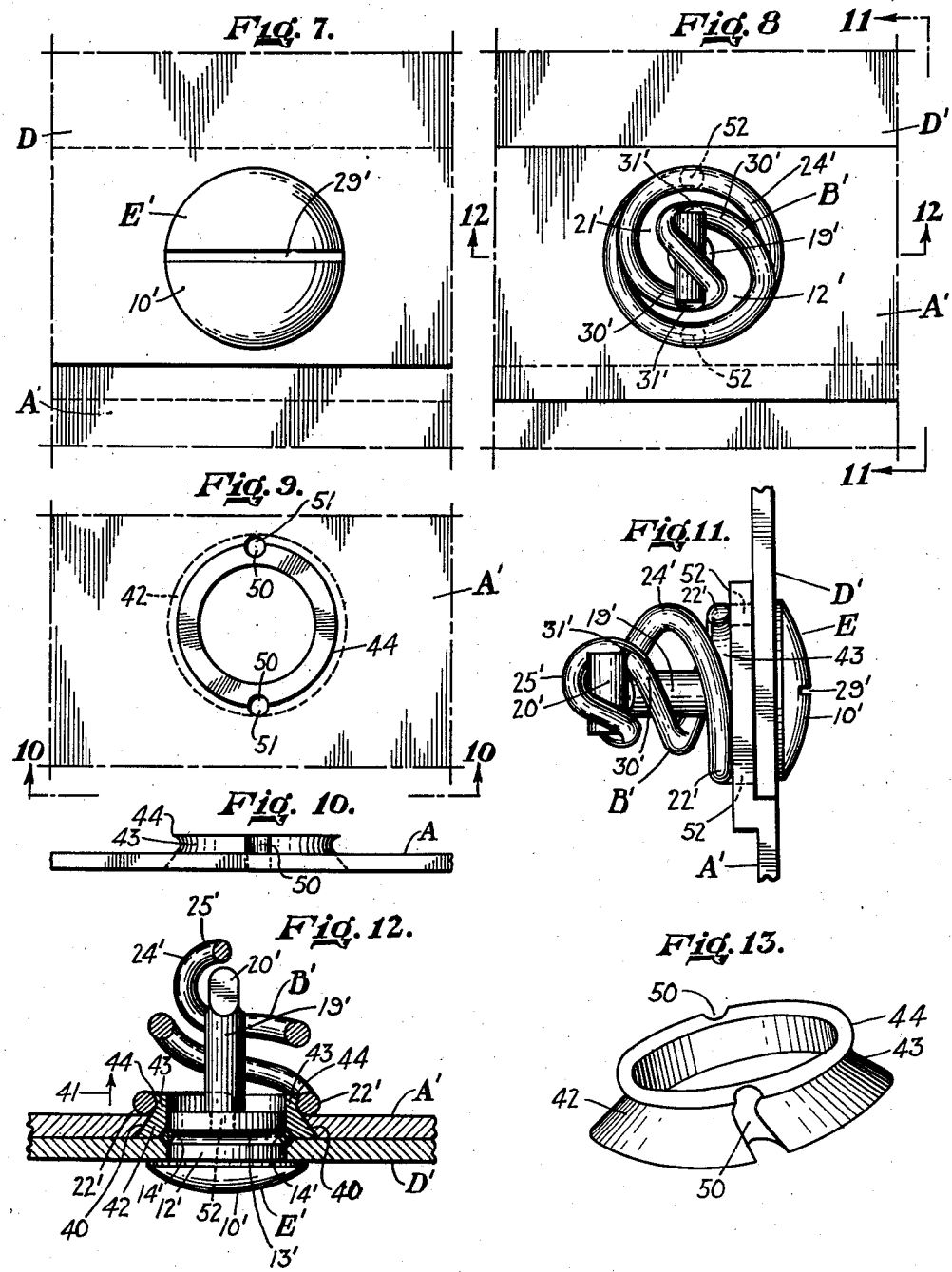

Patented Jan. 9, 1940

2,186,746

UNITED STATES PATENT OFFICE 2,186,746

DOUBLE COIL SPRING FASTENING DEVICE

Jeremiah W. Albin, Babylon, N. Y.

Application December 15, 1937, Serial No. 179,819

13 Claims. (Cl. 24—221)

The present invention relates to a latching device and it particularly relates to a latching device, which is designed to connect together sheet metal elements as for example in connection with cowls, covers, hoods, and so forth, associated with streamline trains, airplanes, automobiles and other structures formed in part or whole of sheet metal stock.

Although not specifically restricted thereto, the present invention will be particularly described in connection with its application to a floor board or sideboard for an automobile or airplane in which metal plate cover is to be rigidly attached or locked to a mounting plate or wall or floor structure with assurance that it will not work itself loose or permit vibration or rattling.

It is among the objects of the present invention to provide a simple locking construction of the character described which will be of inexpensive manufacture and may be readily stamped or formed out of inexpensive metal stock and which may be readily actuated by hand or by suitable tools to make a rigid connection which will not permit of rattling or loosening even though subjected to substantial vibration and which may be utilized for long periods of time without wear, damage or breakage.

Other objects are obvious or will appear during the course of the following specification.

In accomplishing the above objects, it has been found most suitable to provide a key member having an enlarged shank at one end and an actuator formation at the other end enabling it to be turned, which key structure, if desired, may be fixed upon one of the parts or plates to be fastened together.

This key and particularly the enlarged shank thereof is designed to cooperate with a coil spring device, preferably of a converging double coil construction, which spring is designed to form a pocket into which the key may be inserted and also to provide inclined slideways over which the enlarged end or transverse bar of the key may be turned, and recesses into which end or bar may be received to lock the construction in its latched or locked position.

This coil spring construction which preferably consists of a double spiral, the ends of which are mounted upon the support part or supporting plate. The spring preferably rises to a peak, away from the part or plates where the two coils are integrally jointed. The intermediate portions of the coils preferably are recessed or have depressed portions to receive the outstanding bar or arm at the end of the key.

Preferably, the coil should have sufficient resiliency firmly to hold the crossed member of the key in position when the same has been inserted into the spring structure and turned into latched or locked position.

The above and other objects will appear more clearly from the following detailed description when taken in connection with the accompanying drawings which will illustrate preferred embodiments of the inventive idea.

In the drawings are shown several preferred embodiments of the present invention, to which, however, the invention is by no means limited, since these embodiments are shown merely by way of illustration and not by way of limitation.

In the drawings:

Figure 1 is a front view of the locking construction showing portions of the plates or parts carrying the elements of said locking construction, the locking construction being in latched position.

Figure 2 is a rear view of the combination of Figure 1.

Figure 3 is an end view upon the line 3—3 of Figure 2.

Figure 4 is a transverse sectional view upon the line 4—4 of Figure 2, parts being shown in elevation.

Figure 5 is a fragmentary perspective view illustrating the application of the device of Figures 1 to 4 to the attachment of a floor board.

Figure 6 is a fragmentary perspective view showing the device of Figures 1 to 4 with a fillister slot instead of a thumb piece.

Figures 7 to 12 show an alternative embodiment, Figure 7 being a front view; Figure 8 being a rear view; Figure 9 being an inside view of one of the plates, with the spiral spring detached; Figure 10 is an end view upon the line 10—10 of Figure 9; Figure 11 is an end view on the line 11—11 of Figure 8; Figure 12 is a transverse sectional view on the line 12—12 of Figure 8 and Figure 13 is a perspective view of the locking ring detached from the assembly.

Referring to Figures 1 to 5, the support plate or part A carries the spring lock B while the movable plate or part D carries the key E. The key E is preferably provided with a base 10 having the outstanding thumb piece 11 and the cylindrical projection or shank 12 having the groove 13 which receives the lock wire or split locking ring 14.

The plates A and D are provided with recesses 55

15 and 16 to receive the shank 12. The shank 12 is grooved to receive the split locking ring 14 and the split locking ring 14 is also received in the recesses 17 and 18 in said plates (see particularly Figure 4).

The key E is also provided with the shank 19 having the flattened transverse enlargement, bar or extension 20.

The extension 20 and the shank 19 are designed to be received in the interior 21 of the coil spring B which is provided with the two end turns 22 held in place by the rivets 23, extending through openings 60. The end turns 22 continue into two cylindrical coils 24 which extend parallelly to each other until they reach the peak 25, where they are integrally joined.

As indicated in Figure 3, the plate A may be offset, as indicated at 26 to form a pocket for the plate D, so that the outer surfaces 27 and 28 will be flush with each other.

In Figure 5, A is shown as constituting part of a wall or floor, while the panel D is shown as constituting a cover held in position by four locking devices having the keys or key elements E.

In Figure 6, the head of the key or element is modified to have a fillister slot 29.

In operation, the locking device may be turned into the position shown in Figures 1 to 4 by inserting the key into the recesses 21 inside of the coils 24, and then turning it 90 degrees whereupon the transverse bars or cross members or cross bars 20 will slide over the sloping portions 30 of the coils 24 and latch or lock into the recesses 31 in said coils. The coils 24 will firmly retain said cross members 20 in said recesses 31 giving a firm and rigid lock.

It is thus apparent that the present applicant has provided a simple, inexpensive and readily manipulated locking device of general application to airplanes, automobiles, streamline trains, and so forth, and of particular value where there is substantial vibration tending to jar loose the usual type of lock.

The coil spring elements 24 may be readily stamped out or formed by automatic machinery and may be riveted to the plate A without difficulty.

This double coil spring B also has other applications than those specifically shown and which may be utilized broadly, as a valve spring and in other connections.

In the construction shown in Figures 7 to 13, the main change is in the attachment of the main coil spring B', similarly functioning parts being indicated by the same numerals as in Figures 1 to 6, which numerals, however, are primed.

It will be noted, referring to Figures 9 to 12 that the plate A' is provided with a recess 40, which converges in the direction 41. The recess 40 receives a conically shaped collar or ring 42 which has the lip portions 43 having the outstanding portions 44 to engage the lower convolutions 22' of the coil spring B'. The split ring 14' fits in the groove 13' and holds the key E' in position.

Opposite sides of the ring are provided with the half openings 50, which cooperate with the half openings 51 in the plate A' to receive the ends 52 of the coil spring B'.

By the construction, as shown in Figures 7 to 12, it is possible to attach the spring without riveting, as shown in Figures 1 to 4 and without cutting of openings in the plate A to receive rivets. This will permit a stronger plate construction.

At the same time, the rings 42 may be readily assembled with the spring B' by pliers or other tools without difficulty and without special riveting machinery.

It is apparent that the specific illustrations shown above have been given by way of illustration and not by way of limitation and that the structures above described are subject to wide variation and modification without departing from the scope or intent of the invention, all of which variations and modifications are to be included within the scope of the present invention.

What is claimed is:

1. A fastening device comprising separate coengaging fastening elements respectively associated with the parts to be fastened together, said parts being provided with registering openings receiving said fastening device, one of said elements consisting of a key and the other of said elements consisting of a double coil spring, said coil spring and key being positioned on opposite sides of said parts, and openings in said parts to be fastened together to permit said key to be inserted in said coil spring and to be locked with said coil spring, the inner ends of the coils of said springs diverging and being mounted concentrically of said openings on one of said parts on opposite sides of said openings and the outer ends of the coils converging and being integrally joined.

2. In a fastening device for two parts to be secured together, said parts having openings, a converging double coil spring attached to one of said parts in back of the opening and enclosing an axial recess between its coils and a key attached to the other part and having a projecting shank extending forwardly from the opening in said part, the end of said shank having a transverse bar, said transverse bar being designed to engage the coils of said spring, the inner ends of the coils of said springs diverging and being mounted concentrically of said openings on one of said parts on opposite sides of said openings and the outer ends of the coils converging and being integrally joined.

3. A locking device for two parts to be connected together, each of said parts provided with an opening, a double coil spring diverging outwardly to a point of connection between its coils attached in back of one of said openings, a key having an elongated shank extending from the other opening and a cross member on said shank engaging the coils of said spring to lock said parts together, the inner ends of the coils of said springs diverging and being mounted concentrically of said openings on one of said parts on opposite sides of said openings and the outer ends of the coils converging and being integrally joined.

4. A fastening device for two parts having openings comprising separate coengaging fastening elements, one of said elements consisting of a coiled spring forming a central recess attached to one part, a key fastened to a second part, said key being so formed as to project into the recess in said spring and having transverse end extensions for interlocking engagement with said spring to detachably fasten said parts together, the inner ends of the coils of said springs diverging and being mounted concentrically of said openings on one of said parts on opposite sides of said openings and the outer ends of the coils converging and being integrally joined.

5. A fastening device for two parts with openings comprising separate fastening elements, one of said elements consisting of a double spring coil having the inside ends of each coil mounted on one part on opposite sides of the opening therein and the outside ends being integrally connected together, the second of said elements being a key having an elongated shank and a cross bar at the end thereof to engage the coil, said key being so formed as to project inside of said spring and said cross bar being formed for interlocking engagement with said spring by the turning movement of the key to detachably fasten said parts together.

6. A fastening device comprising separate co-engaging key and lock elements, said elements both having means including locking rings to attach them to the different parts to be fastened together, the lock element consisting of a double converging coil spring and the key element being applied to one of said parts for turning movement and having a transverse extension as to have interlocking engagement with said spring.

7. A fastening device comprising key and converging double coil spring elements, having respectively turning and fixed mounts on two parts to be connected together, and means on the end of said key formed as to have interlocking engagement with said coil spring upon turning movement of the key, to detachably fasten said parts together.

8. A fastening device for two parts having cooperating openings, said parts carrying a turning key and a fixed converging double coil spring, the key having portions engaging and locking with the coils of said spring.

9. A fastening device for two parts having cooperating openings, said parts carrying a turning key and a fixed converging double coil spring, the key having portions engaging and locking with the coils of said spring, the part carrying the coil spring having an attaching ring in its opening holding the ends of said spring.

10. A fastening device for two parts having cooperating openings, said parts carrying a turning key and a fixed converging double coil spring, the key having portions engaging and locking with the coils of said spring, the part carrying the coil spring having a conical ring with openings in the sides thereof holding the ends of said spring.

11. A fastening device comprising separate co-engaging fastening elements respectively associated with the parts to be fastened together, said parts being provided with registering openings receiving said fastening device, one of said elements consisting of a key and the other of said elements consisting of a double coil spring, said coil spring and key being positioned on opposite sides of said parts, and openings in said parts to be fastened together to permit said key to be inserted in said coil spring and to be locked with said coil spring, the inner ends of the coils of said springs diverging and being mounted concentrically of said openings on one of said parts on opposite sides of said openings and the outer ends of the coils converging and being integrally joined, said coil spring forming a conical recess in which said key is inserted and the coils of said spring forming inclined planes with which said key cooperates to form the lock.

12. A fastening device for two parts with openings comprising separate fastening elements, one of said elements consisting of a double coil spring having the inside ends of each coil mounted on one part on opposite sides of the opening therein and the outside ends being integrally connected together, the second of said elements being a key having an elongated shank and a cross bar at the end thereof to engage the coil, said key being so formed as to project inside of said spring and said cross bar being formed for interlocking engagement with said spring by the turning movement of the key to detachably fasten said parts together, said spring coil forming a conical recess in which said shank and cross bar are to be inserted and the coils of said spring forming inclined planes for engagement with said cross bar and the coils of said spring being notched at the limit of movement of said cross bar.

13. A fastening device for two parts with openings comprising separate fastening elements, one of said elements consisting of a double coil spring having the inside ends of each coil mounted on one part at the opening therein and the outside ends being connected together, the second of said elements being a key having an elongated shank and a transverse element at the end thereof to engage the coil, said key being so formed as to project inside of said spring and said transverse element being formed for interlocking engagement with said spring by the turning movement of the key to detachably fasten said parts together, said spring coil forming a recess in which said shank and transverse element are to be inserted and the coils of said spring forming inclined planes for engagement with said transverse element.

JEREMIAH W. ALBIN.